United States Patent
Lee et al.

(10) Patent No.: US 9,438,743 B1
(45) Date of Patent: Sep. 6, 2016

(54) PERSONAL SAFETY GLOVE

(71) Applicants: Gregory Lee, Loganville, GA (US);
Adeline Lee, Loganville, GA (US)

(72) Inventors: Gregory Lee, Loganville, GA (US);
Adeline Lee, Loganville, GA (US)

( * ) Notice: Subject to any disclaimer, the term of this patent is extended or adjusted under 35 U.S.C. 154(b) by 0 days.

(21) Appl. No.: 14/851,160

(22) Filed: Sep. 11, 2015

(51) Int. Cl.
| | |
|---|---|
| *H04W 4/22* | (2009.01) |
| *G06F 3/01* | (2006.01) |
| *H04M 11/04* | (2006.01) |
| *A41D 19/00* | (2006.01) |
| *H04W 76/00* | (2009.01) |
| *H04W 4/02* | (2009.01) |

(52) U.S. Cl.
CPC .......... *H04M 11/04* (2013.01); *A41D 19/0031* (2013.01); *H04W 4/02* (2013.01); *H04W 4/22* (2013.01); *H04W 76/007* (2013.01)

(58) Field of Classification Search
CPC ........... F41H 9/10; G08B 23/00; G08B 7/00; G08B 3/10; G02B 6/001; G06F 3/03545; G06F 1/163; G06F 3/014; F21V 23/0414; F21V 21/08; H04R 1/02; F21W 2111/06; G09G 5/00; H04M 1/02; H04M 1/0202; G03B 17/561; H04N 5/23296; H04N 5/2353
USPC ...... 455/100, 404.1, 404.2, 456.1, 567, 569, 455/575.1; 262/103, 160, 184, 570, 802; 240/348.2, 348.3, 348.7; 345/156–158, 345/204
See application file for complete search history.

(56) References Cited

U.S. PATENT DOCUMENTS

| | | | |
|---|---|---|---|
| 5,177,467 A | 1/1993 | Chung-Piao | |
| 5,365,213 A | 11/1994 | Paull et al. | |
| 5,503,304 A | 4/1996 | Keller et al. | |
| 2002/0164976 A1* | 11/2002 | Chen ................... | G06Q 10/087 455/414.1 |
| 2009/0153477 A1* | 6/2009 | Saenz ..................... | G06F 3/014 345/158 |
| 2010/0154097 A1* | 6/2010 | Roscher ............. | A41D 19/0024 2/160 |
| 2010/0225758 A1* | 9/2010 | Mashiah ................ | H04N 7/183 348/143 |
| 2013/0162632 A1* | 6/2013 | Varga ................... | G06T 19/006 345/419 |
| 2014/0134575 A1* | 5/2014 | Kim ..................... | G09B 21/025 434/114 |
| 2014/0194166 A1* | 7/2014 | Falck .................. | A41D 19/0024 455/567 |
| 2014/0240214 A1* | 8/2014 | Liu ......................... | G06F 3/039 345/156 |
| 2015/0016093 A1* | 1/2015 | Wilson ............... | A41D 19/0024 362/103 |
| 2015/0130698 A1* | 5/2015 | Burgess .................. | G06F 1/163 345/156 |
| 2015/0237181 A1* | 8/2015 | Khan .................. | H04M 1/0202 455/556.1 |
| 2016/0054645 A1* | 2/2016 | Contino .............. | G03B 17/561 348/211.99 |

* cited by examiner

*Primary Examiner* — Khawar Iqbal
(74) *Attorney, Agent, or Firm* — Crossley & Stevenson Intellectual Property Law

(57) ABSTRACT

A personal safety glove including a glove having a top surface, a bottom surface, and an adjustable cuff. A camera, a speaker, an activation control, a charging port, an emergency control, and an indicator light are disposed on the glove. A rechargeable battery, a GPS tracking chip, and a microprocessor are disposed within the glove. The emergency control has a first position, an alternate second position, and an alternate third position. The emergency control is configured to activate the speaker to sound an alarm when the emergency control is in the first position. The emergency control is configured to activate the camera when the emergency control is in the second position. The emergency control is configured to activate the GPS tracking chip when the emergency control is in the third position.

9 Claims, 3 Drawing Sheets

PERSONAL SAFETY GLOVE

BACKGROUND OF THE INVENTION

Various types of personal safety devices are known in the prior art. However, what has been needed is a personal safety glove including a glove having a top surface, a bottom surface, and an adjustable cuff. What has been further needed is for a camera, a speaker, an activation control, a charging port, an emergency control, and an indicator light to be disposed on the glove. A rechargeable battery, a GPS tracking chip, and a microprocessor are disposed within the glove. Lastly, what has been needed is for the emergency control to have a first position, an alternate second position, and an alternate third position. The emergency control is configured to activate the speaker to sound an alarm when the emergency control is in the first position. The emergency control is configured to activate the camera when the emergency control is in the second position. The emergency control is configured to activate the GPS tracking chip when the emergency control is in the third position. The personal safety glove thus provides a user with a way in which to protect himself in an emergency situation, with the option of sounding an alarm, recording the situation and, alternately, alerting the police department to the situation and the user's real time location.

FIELD OF THE INVENTION

The present invention relates to personal safety devices, and more particularly, to a personal safety glove.

SUMMARY OF THE INVENTION

The general purpose of the present personal safety glove, described subsequently in greater detail, is to provide a personal safety glove which has many novel features that result in a personal safety glove which is not anticipated, rendered obvious, suggested, or even implied by prior art, either alone or in combination thereof. To accomplish this, the present personal safety glove includes a glove having a top surface, a bottom surface, and an adjustable cuff. The glove is optionally fingerless to ensure that a user can still fully utilize his fingers while wearing the glove. A camera is disposed on the glove. The camera is optionally disposed on the bottom surface of the glove proximal the cuff. The camera is configured to record still photos and, alternately, video. A GPS tracking chip is disposed within the glove. The GPS tracking chip is configured to notify a police department that the user is in an emergency situation and to alert the police department as to a location of the user. A speaker, an activation control, and an indicator light are disposed on the glove. The speaker is optionally disposed on the top surface of the glove to better ensure that bystanders hear an alarm sounded through the speaker. The activation control is optionally disposed on the top surface of the glove. The indicator light is configured to light when the activation control is activated. A rechargeable battery is disposed within the glove. A charging port is disposed on the glove. The charging port is optionally disposed on the top surface of the glove. The charging port is attached to the rechargeable battery. A right end of a power cord is removably attachable to the charging port, and a left end of the power cord is removably attachable to a power source. A microprocessor is disposed within the glove.

The personal safety glove further includes an emergency control disposed on the glove. The emergency control is optionally disposed on the bottom surface of the glove proximal a thumbhole so that the user can easily activate the control in an emergency situation. The emergency control has a first position, an alternate second position, and an alternate third position. The emergency control is in the first position when the emergency control is depressed a single time by the user. The emergency control is in the second position when the emergency control is depressed two consecutive times by the user. The emergency control is in the third position when the emergency control is depressed three consecutive times by the user. The emergency control is configured to activate the speaker to sound the alarm when the emergency control is in the first position. The emergency control is configured to activate the camera when the emergency control is in the second position. The emergency control is configured to activate the GPS tracking chip when the emergency control is in the third position. The camera, the GPS tracking chip, the speaker, the activation control, the indicator light, the rechargeable battery, the microprocessor, and the emergency control are in operational communication with each other.

The personal safety glove optionally includes a rectangular flap and a pair of adhesive strips. The rectangular flap has a top side attached to the top surface of the glove above the charging port. The pair of adhesive strips includes a first adhesive strip and a second adhesive strip. The first adhesive strip is continuously disposed on an interior surface of the flap proximal an outer edge. The second adhesive strip is continuously disposed on the top surface of the glove proximal the charging port. The first adhesive strip is configured to removably attach the flap to the second adhesive strip in order to removably cover the charging port.

Thus has been broadly outlined the more important features of the present personal safety glove so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
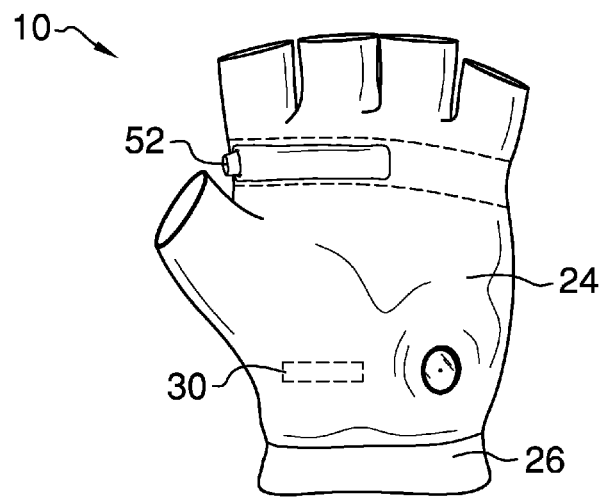
FIG. 1 is a rear elevation view.
Figure 2:
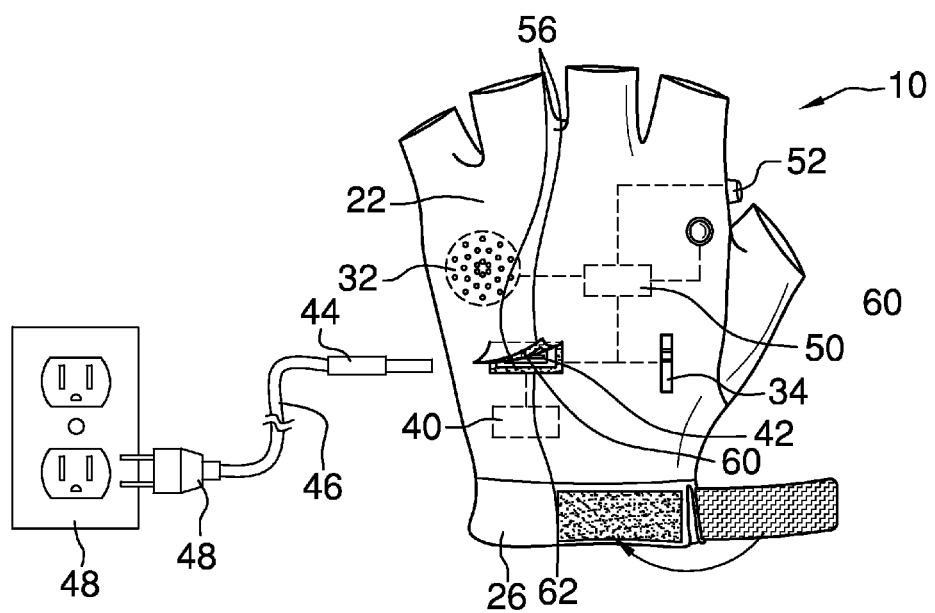
FIG. 2 is a front elevation view.
Figure 3:
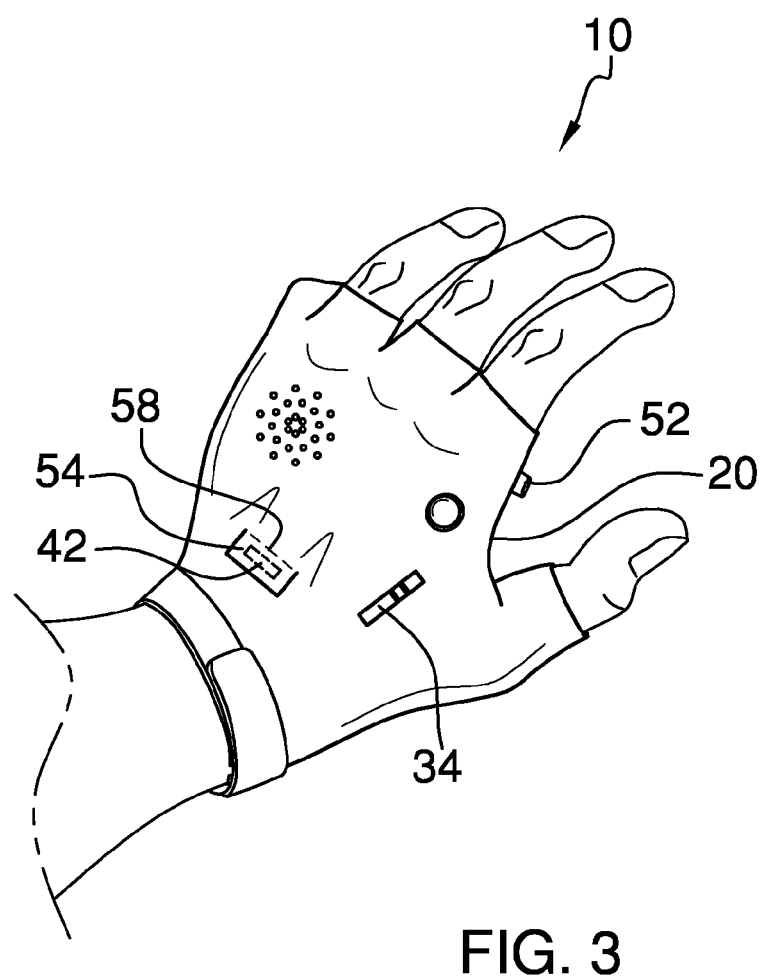
FIG. 3 is an in-use view.

With reference now to the drawings, and in particular FIGS. 1 through 4 thereof, an example of the instant personal safety glove employing the principles and concepts of the present personal safety glove and generally designated by the reference number 10 will be described.

Referring to FIGS. 1 through 4 the present personal safety glove 10 is illustrated. The personal safety glove 10 includes a glove 20 having a top surface 22, a bottom surface 24, and an adjustable cuff 26. A camera 28 is disposed on the glove 20. The camera 28 is optionally disposed on the bottom surface 24 of the glove 20 proximal the cuff 26. A GPS tracking chip 30 is disposed within the glove 20. A speaker 32, an activation control 34, and an indicator light 36 are disposed on the glove 20. The speaker 32 is optionally disposed on the top surface 22 of the glove 20. The activation control 34 is optionally disposed on the top surface 22 of the glove 20. A rechargeable battery 40 is disposed within the glove 20. A charging port 42 is disposed on the glove 20.

The charging port 42 is optionally disposed on the top surface 22 of the glove 20. The charging port 42 is attached to the rechargeable battery 40. A right end 44 of a power cord 46 is removably attachable to the charging port 42, and a left end 48 of the power cord 46 is removably attachable to a power source 48. A microprocessor 50 is disposed within the glove 20.

Figure 4:
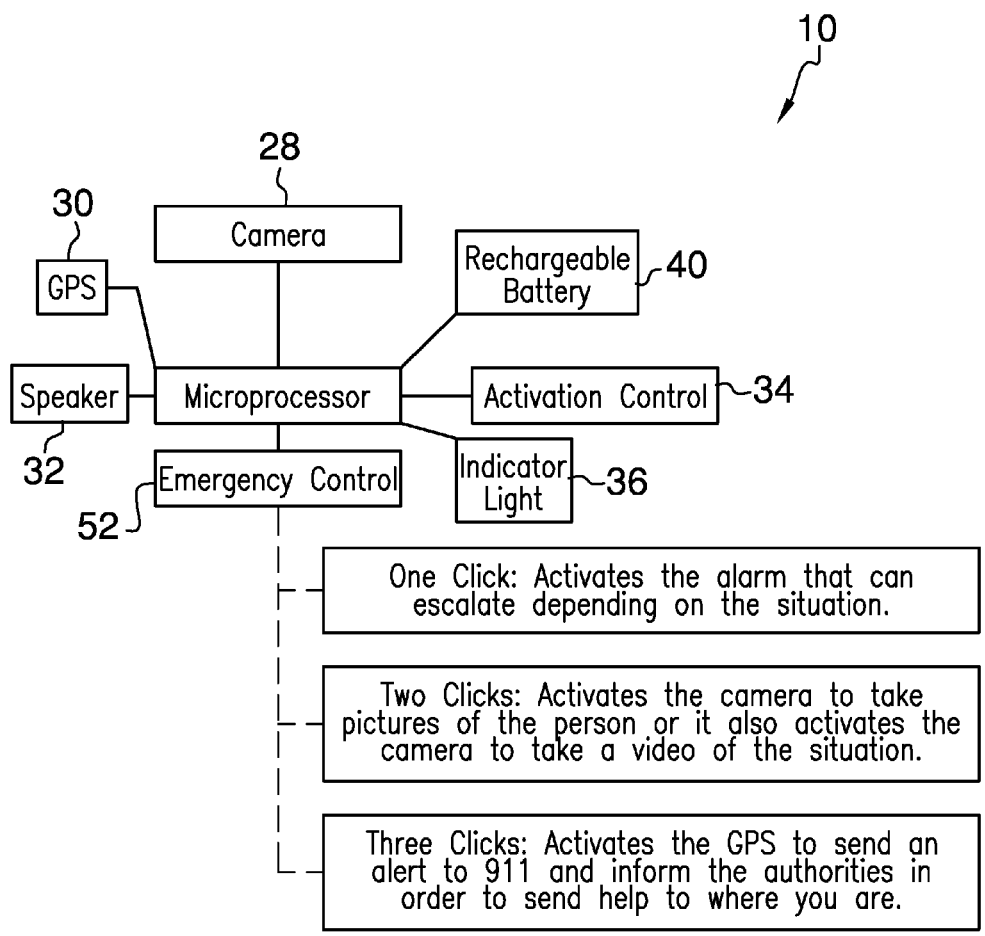
FIG. 4 is a block diagram.

The personal safety glove 10 further includes an emergency control 52 disposed on the glove 20. The emergency control 52 is optionally disposed on the bottom surface 24 of the glove 20 proximal the cuff 26. As best shown in FIG. 4, the emergency control 52 has a first position, an alternate second position, and an alternate third position. The emergency control 52 is in the first position when the emergency control 52 is depressed a single time by a user. The emergency control 52 is in the second position when the emergency control is depressed two consecutive times by the user. The emergency control 52 is in the third position when the emergency control is depressed three consecutive times by the user. The emergency control 52 is configured to activate the speaker 32 to sound an alarm when the emergency control 52 is in the first position. The emergency control 52 is configured to activate the camera 28 when the emergency control 52 is in the second position. The emergency control 52 is configured to activate the GPS tracking chip 30 when the emergency control 52 is in the third position. The camera 28, the GPS tracking chip 30, the speaker 32, the activation control 34, the indicator light 36, the rechargeable battery 40, the microprocessor 50, and the emergency control 52 are in operational communication with each other.

The personal safety glove 10 optionally includes a rectangular flap 54 and a pair of adhesive strips 56. The rectangular flap 54 has a top side 58 attached to the top surface 22 of the glove 20 above the charging port 42. The pair of adhesive strips 56 includes a first adhesive strip 60 and a second adhesive strip 62. The first adhesive strip 60 is continuously disposed on an interior surface 64 of the flap 54 proximal an outer edge 66. The second adhesive strip 62 is continuously disposed on the top surface 22 of the glove 20 proximal the charging port 42.

What is claimed is:

1. A personal safety glove comprising:
    a glove having a top surface, a bottom surface, and an adjustable cuff;
    a camera disposed on the glove, wherein the camera is configured to record still photos and, alternately, video;
    a GPS tracking chip disposed within the glove;
    wherein the GPS tracking chip is configured to notify a police department that a user is in an emergency situation and to alert the police department as to a location of the user;
    a speaker disposed on the glove;
    an activation control disposed on the glove;
    an indicator light disposed on the glove, wherein the indicator light is configured to light when the activation control is activated;
    a rechargeable battery disposed within the glove;
    a charging port disposed on the glove, the charging port attached to the rechargeable battery, wherein a right end of a power cord is removably attachable to the charging port, wherein a left end of the power cord is removably attachable to a power source;
    a microprocessor disposed within the glove; and
    an emergency control disposed on the glove;
    wherein the emergency control has a first position, an alternate second position, and an alternate third position;
    wherein the emergency control is in the first position when the emergency control is depressed a single time by the user;
    wherein the emergency control is in the second position when the emergency control is depressed two consecutive times by the user;
    wherein the emergency control is in the third position when the emergency control is depressed three consecutive times by the user;
    wherein the emergency control is configured to activate the speaker to sound an alarm when the emergency control is in the first position;
    wherein the emergency control is configured to activate the camera when the emergency control is in the second position;
    wherein the emergency control is configured to activate the GPS tracking chip when the emergency control is in the third position;
    wherein the camera, the GPS tracking chip, the speaker, the activation control, the indicator light, the rechargeable battery, the microprocessor, and the emergency control are in operational communication with each other.

2. The personal safety glove of claim 1 wherein the camera is disposed on the glove bottom surface proximal the cuff.

3. The personal safety glove of claim 1 wherein the speaker is disposed on the glove top surface.

4. The personal safety glove of claim 1 wherein the activation control is disposed on the glove top surface.

5. The personal safety glove of claim 1 wherein the emergency control is disposed on the glove bottom surface proximal a thumbhole.

6. The personal safety glove of claim 1 wherein the charging port is disposed on the glove top surface.

7. The personal safety glove of claim 6 further comprising:
    a rectangular flap having a top side attached to the glove top surface above the charging port;
    a pair of adhesive strips comprising a first adhesive strip and a second adhesive strip, wherein the first adhesive strip is continuously disposed on an interior surface of the flap proximal an outer edge, and the second adhesive strip is continuously disposed on the glove top surface proximal the charging port, wherein the first adhesive strip is configured to removably attach the flap to the second adhesive strip in order to removably cover the charging port.

8. The personal safety glove of claim 1 wherein the glove is fingerless.

9. A personal safety glove comprising:
    a fingerless glove having a top surface, a bottom surface, and an adjustable cuff;
    a camera disposed on the glove bottom surface proximal the cuff, wherein the camera is configured to record still photos and, alternately, video;
    a GPS tracking chip disposed within the glove;
    wherein the GPS tracking chip is configured to notify a police department that a user is in an emergency situation and to alert the police department as to a location of the user;
    a speaker disposed on the glove;
    an activation control disposed on the glove top surface;

an indicator light disposed on the glove, wherein the indicator light is configured to light when the activation control is activated;
a rechargeable battery disposed within the glove;
a charging port disposed on the glove top surface, the charging port attached to the rechargeable battery, wherein a right end of a power cord is removably attachable to the charging port, wherein a left end of the power cord is removably attachable to a power source;
a microprocessor disposed within the glove;
an emergency control disposed on the glove bottom surface proximal a thumbhole;
wherein the emergency control has a first position, an alternate second position, and an alternate third position;
wherein the emergency control is in the first position when the emergency control is depressed a single time by the user;
wherein the emergency control is in the second position when the emergency control is depressed two consecutive times by the user;
wherein the emergency control is in the third position when the emergency control is depressed three consecutive times by the user;
wherein the emergency control is configured to activate the speaker to sound an alarm when the emergency control is in the first position;
wherein the emergency control is configured to activate the camera when the emergency control is in the second position;
wherein the emergency control is configured to activate the GPS tracking chip when the emergency control is in the third position;
wherein the camera, the GPS tracking chip, the speaker, the activation control, the indicator light, the rechargeable battery, the microprocessor, and the emergency control are in operational communication with each other;
a rectangular flap having a top side attached to the glove top surface above the charging port; and
a pair of adhesive strips comprising a first adhesive strip and a second adhesive strip, wherein the first adhesive strip is continuously disposed on an interior surface of the flap proximal an outer edge, and the second adhesive strip is continuously disposed on the glove top surface proximal the charging port, wherein the first adhesive strip is configured to removably attach the flap to the second adhesive strip in order to removably cover the charging port.

* * * * *